(12) United States Patent
Jones

(10) Patent No.: US 6,447,151 B1
(45) Date of Patent: Sep. 10, 2002

(54) VARIABLE BEAM HEADLIGHTS

(76) Inventor: Russell K. Jones, 890 Seale Ave., Palo Alto, CA (US) 94303

(*) Notice: Subject to any disclaimer, the term of this patent is extended or adjusted under 35 U.S.C. 154(b) by 0 days.

(21) Appl. No.: 09/904,984

(22) Filed: Jul. 12, 2001

(51) Int. Cl.[7] .................................................. B60Q 1/06
(52) U.S. Cl. ........................ 362/465; 362/514; 362/513; 362/466; 362/523
(58) Field of Search ................................. 362/465, 466, 362/467, 514, 523, 526, 508, 513

(56) References Cited

U.S. PATENT DOCUMENTS

| | | | | |
|---|---|---|---|---|
| 4,194,235 A | * | 3/1980 | Heinleing ..................... | 365/38 |
| 4,217,627 A | | 8/1980 | Tomita et al. ................. | 362/71 |
| 4,747,032 A | | 5/1988 | Weber ......................... | 362/294 |
| 4,755,917 A | | 7/1988 | Bals et al. .................... | 362/267 |
| 4,855,884 A | | 8/1989 | Richardson ................. | 362/278 |
| 4,872,098 A | * | 10/1989 | Romano ..................... | 362/283 |
| 5,119,068 A | * | 6/1992 | Nagai et al. ................. | 340/479 |
| 5,438,486 A | | 8/1995 | McNair ........................ | 362/61 |
| 5,479,323 A | * | 12/1995 | Shibata et al. ................ | 362/71 |
| 5,775,794 A | | 7/1998 | Schmitt ....................... | 362/66 |
| 5,923,125 A | * | 7/1999 | Endo ........................... | 315/82 |

* cited by examiner

*Primary Examiner*—Stephen Husar
*Assistant Examiner*—Anabel Ton
(74) *Attorney, Agent, or Firm*—Thomas Schneck; Gina McCarthy

(57) ABSTRACT

A variable beam width headlight whose beam width decreases and length increases as velocity of a vehicle increases and whose beam width increases and length decreases as velocity of a vehicle decreases. As the velocity of a vehicle increases or decreases so too does the airflow to the headlights. Therefore, airflow can be used as a measurement of an increase or decrease in velocity. Each headlight has a reflector, a light source within the reflector and an aperture through which a beam passes after light rays from the light source have been reflected from a reflector surface. When the velocity of a car increases, the aperture of the reflector decreases in size resulting in a narrower, longer beam of light allowing the driver to see objects far in the distance. When the velocity of a car decreases, the aperture of the reflector increases in size resulting in a wider, shorter beam of light allowing the driver to see objects nearby that are to either side of him. In one embodiment an actuator is used to change the reflector aperture size. In another embodiment airflow to the reflector urges the reflector in an inward direction decreasing the size of the aperture.

24 Claims, 5 Drawing Sheets

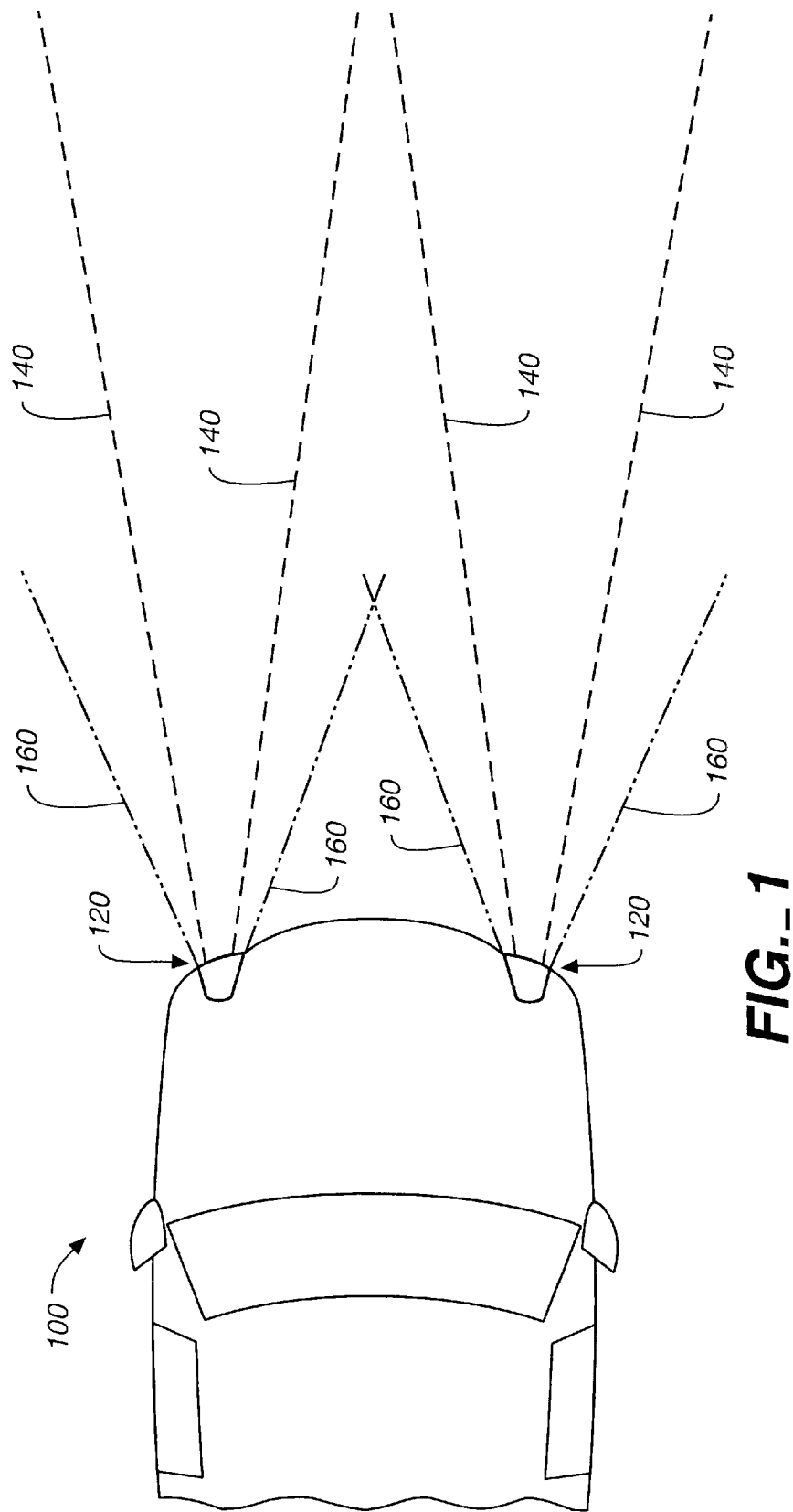
FIG._1

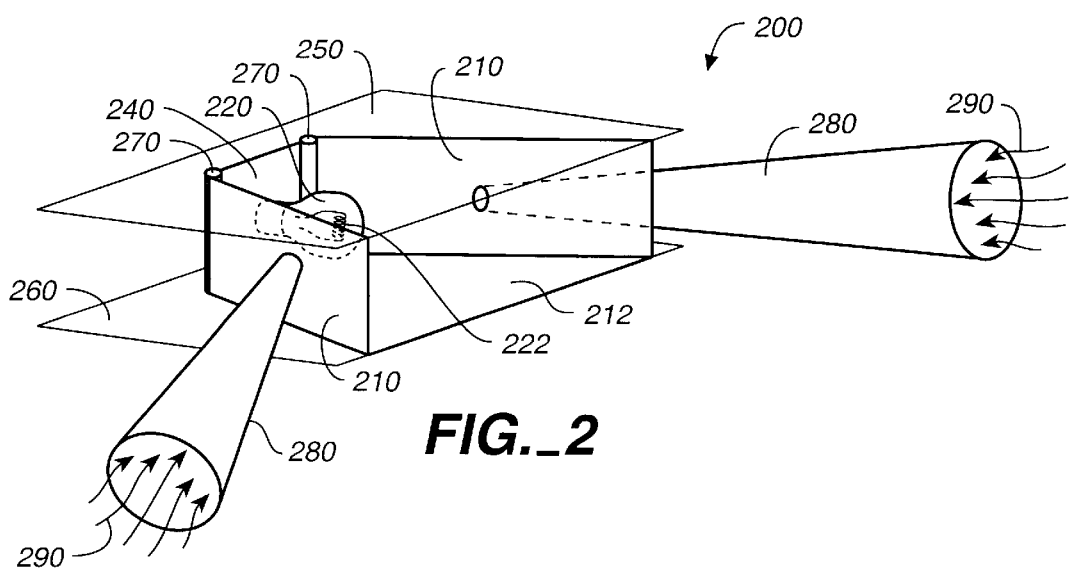
FIG._2
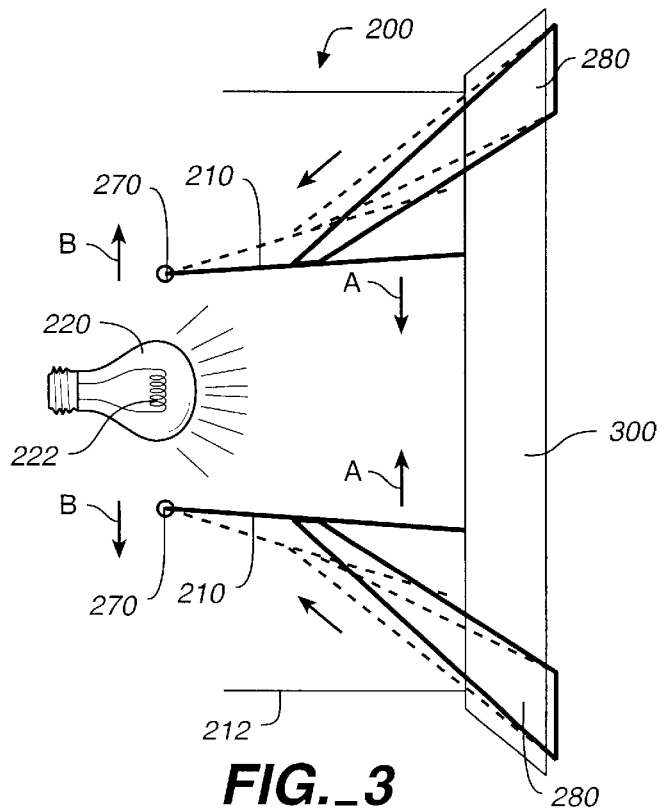
FIG._3

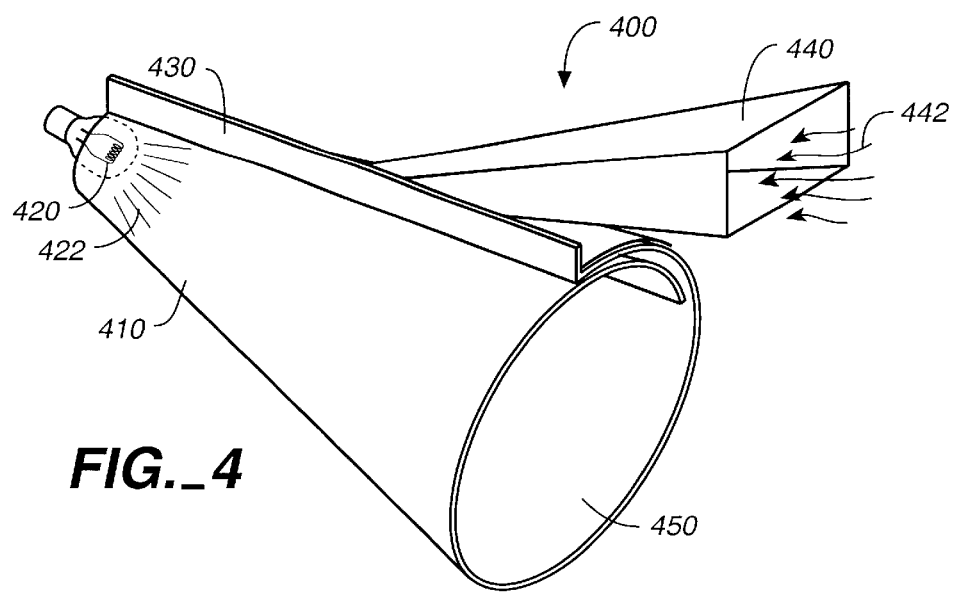
FIG._4
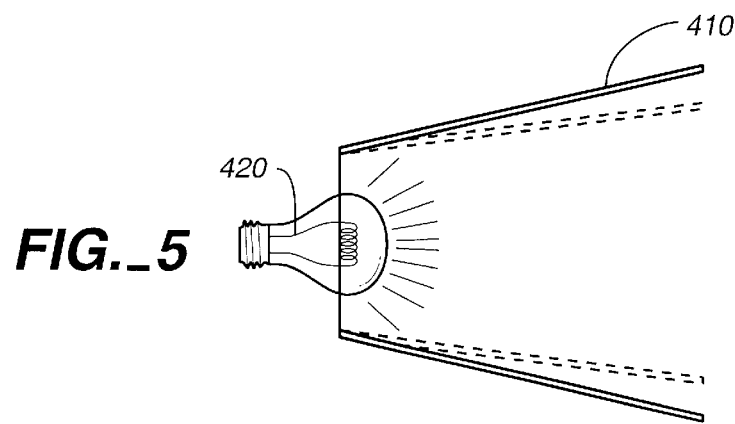
FIG._5
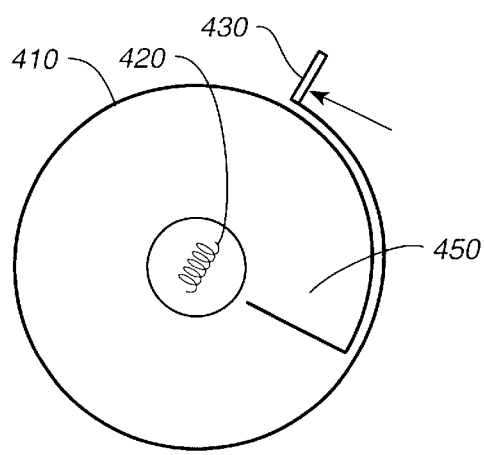 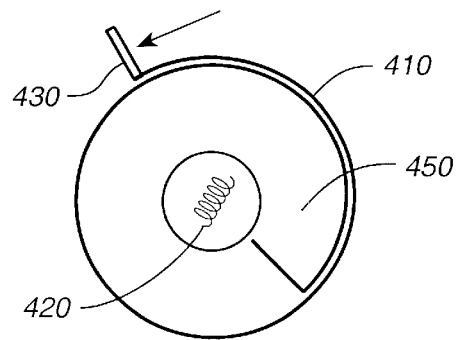
FIG._5A  FIG._5B

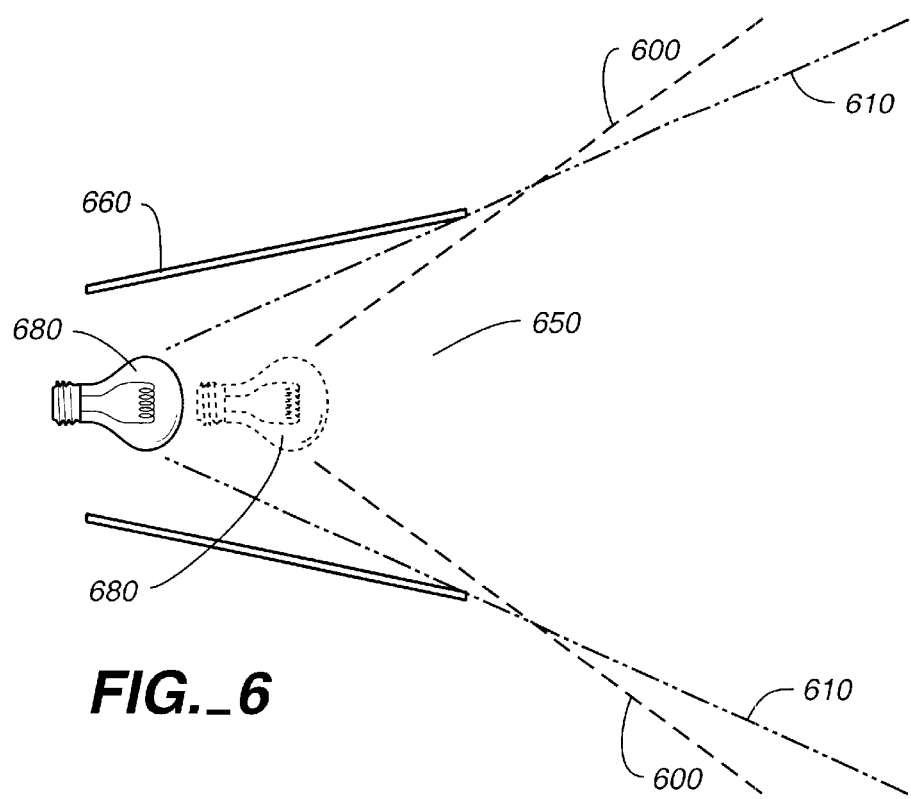
FIG._6
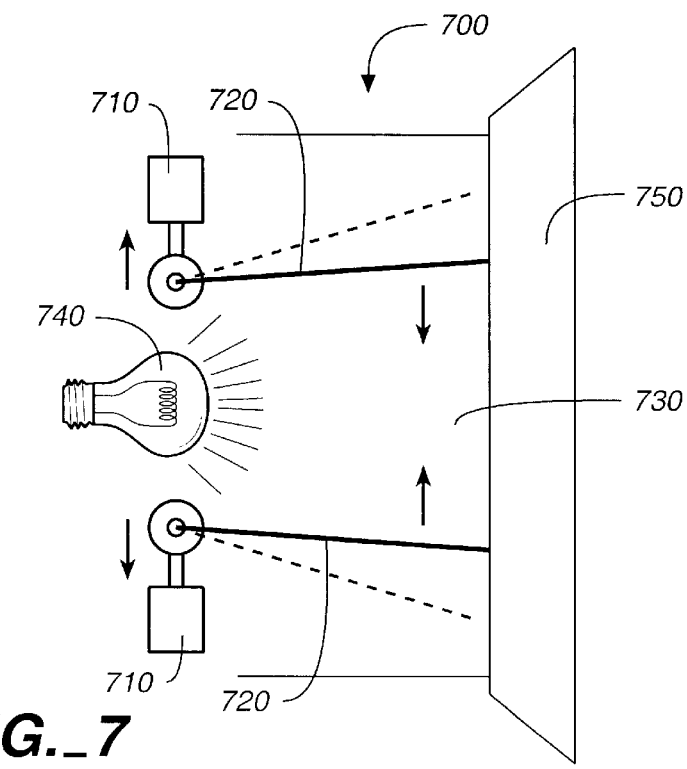
FIG._7

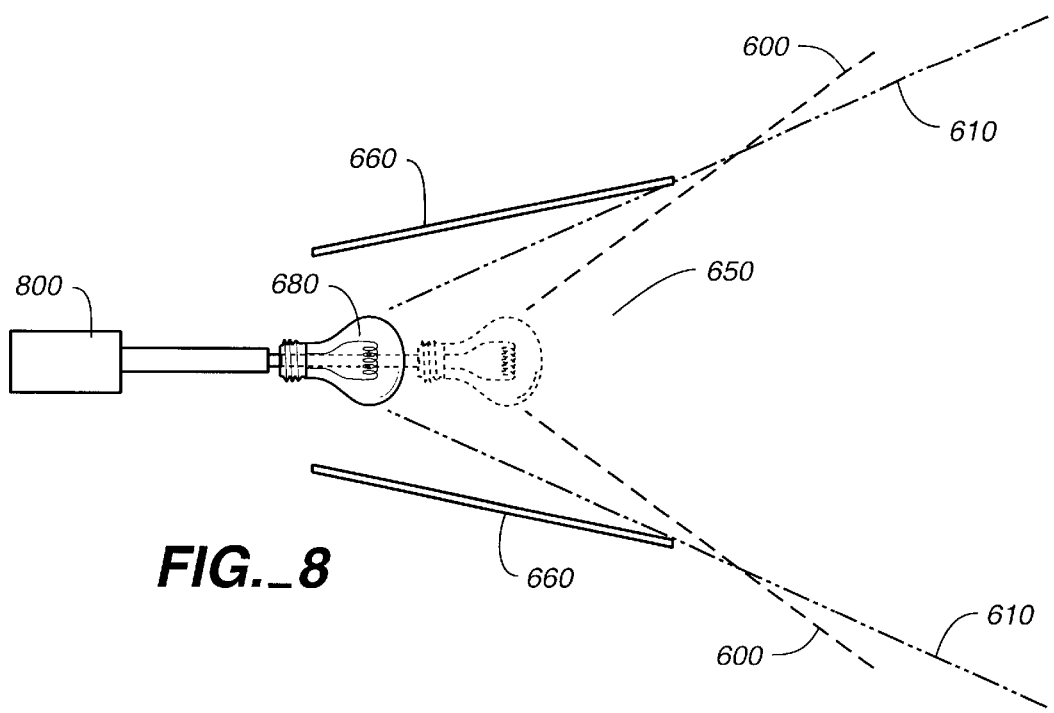
FIG._8
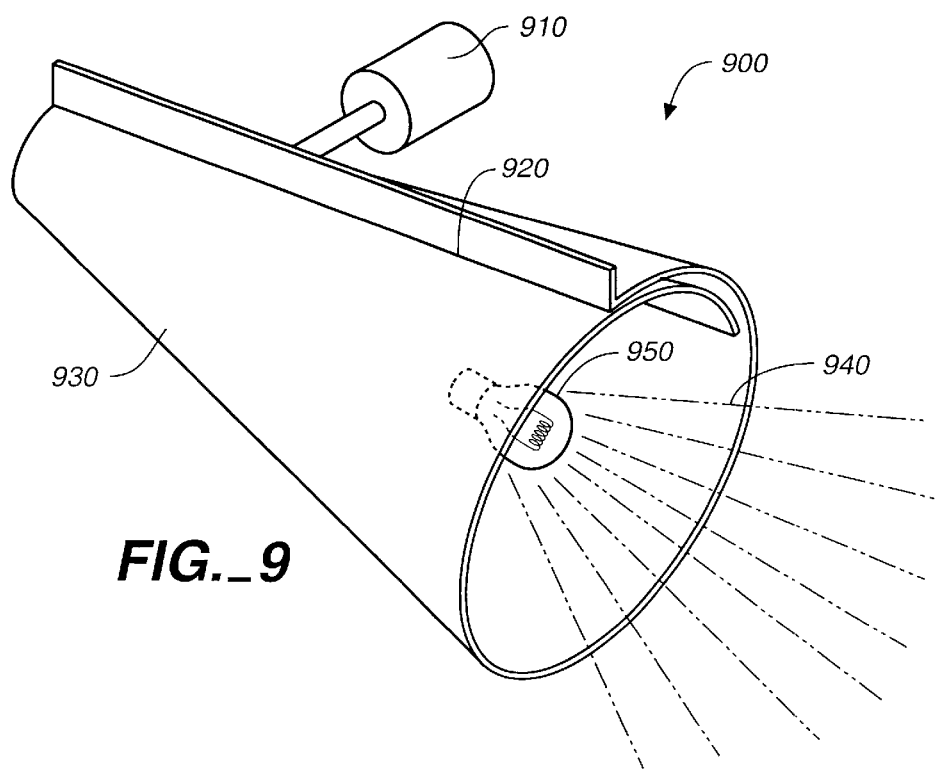
FIG._9

VARIABLE BEAM HEADLIGHTS

TECHNICAL FIELD

The present invention relates generally to headlights and in particular to headlights having variable beam dimensions.

BACKGROUND ART

When a driver operates a vehicle at rapid speeds, especially during nighttime, it is important that the vehicle provides the driver with the ability to see objects far ahead of him. Conversely, when a driver operates a vehicle at slower speeds, it is important that the driver is able to see nearby objects that are in front of him or to either side of him.

Conventional headlights have long been used to improve driver visibility. However, when traveling at fast speeds down long roads, conventional headlights do not often provide sufficient illumination of objects that are relatively distant. In a parking lot or in other locations where the driver should operate the vehicle at slower speeds, it is important for the driver to see objects near to him that are in front of or to the left or right of him. Conventional headlights allow for a driver to have visibility of objects that are nearby and in front of him. However, they do not provide illumination of nearby objects to either side of the driver. Visibility of such objects, such as other vehicles or pedestrians, is important to the safety of the driver as well as other drivers and pedestrians.

It would be desirable to have a headlight that emits a beam of appropriate dimensions (length and width) at various driving speeds to assist in improving a driver's visibility.

U.S. Pat. No. 4,855,884 to Richardson does provide for a variable beam width light. However, this light is a stage light that relies upon an axially movable reflector for changes in the width of the beam. The reflector comprises slightly spaced apart reflective leaves, forming a bowl shaped structure. A motor driven lead screw engages a base member (supporting the reflector) and as the lead screw is rotated the base member moves to create axial displacement of the reflector and of the lamp present in the stage light. This apparatus is not used in conjunction with a vehicle. It does not take into account the speed of a vehicle and does not use the speed of a vehicle to influence the width or length of a beam of light.

It is thus an object of the present invention to provide a headlight having variable beam dimensions that are dependent on vehicular velocity.

It is an object of the invention to provide a headlight having variable beam dimensions that are dependent upon airflow to a reflector, which is dependent upon vehicular velocity.

It is another object of the invention to provide a headlight having variable beam dimensions that is operated automatically.

It is a further object of the invention to provide a headlight having a variable beam width and length wherein said beam narrows and lengthens as vehicular velocity increases and widens and shortens as vehicular velocity decreases.

It is an object of the invention to provide a headlight having a variable beam width and length wherein said beam narrows and lengthens as airflow to a headlight reflector increases and widens and shortens as airflow decreases.

SUMMARY OF THE INVENTION

The above objects have been met by a vehicular headlight having a light source, and a beam forming reflector. The light source directs light towards the reflector which is for example, biased in an open position and which has an aperture whose size is controlled by the velocity of a vehicle or the airflow intensity to the reflector and whose size increases or decreases with velocity. As the velocity increases, the aperture size thus the beam width decreases and the length increases, allowing a driver to see objects far ahead in the distance. As the velocity decreases, the aperture size thus the beam width increases and the length decreases, allowing a driver to see objects nearby and to either side or in front of him.

A further advantage of the present invention is that the changes in beam width and length occur automatically when the car is in operation therefore the driver need not manually make such changes.

In one embodiment of the invention, the reflector comprises a pair of outwardly spring-biased vanes, each vane coupled to an air duct. Airflow through the air duct increases as the velocity at which the vehicle travels increases. When the car reaches a velocity that provides an airflow through the duct that is sufficient to overcome the reflector bias, the reflector vanes move inwardly, thus decreasing the size of the aperture and decreasing the width of the beam. Conversely, when the vanes are in a position where the bias has been overcome, as the car decelerates the reflector aperture widens and the beam width widens as the vanes give in to the bias of the spring. As the beam width widens, the length decreases. As the beam width narrows, the length increases.

In another embodiment the reflector is conical in shape and includes a spring-biased radial arm varying the reflector aperture size. An air duct is coupled to the radial arm. The cone may be tightened or loosened by the radial arm under the influence of the air duct. Airflow through the air duct increases as the velocity at which the vehicle travels increases. When the car reaches a velocity that provides airflow through the duct that is sufficient to overcome the spring bias the radial arm tightens, thus decreasing the size of the aperture and decreasing the width of the beam and increasing the length. Conversely, when the radial arm is in a position where the bias has been overcome, as the car decelerates the reflector aperture widens and the beam width widens as the radial arm gives in to the bias of the spring.

In a further embodiment of the invention a velocity sensor of the vehicle provides a signal to the reflector. When the speed reaches a certain level the reflector receives a signal that causes, through an actuator, the reflector to either narrow its aperture so that the beam that emerges from the aperture is narrowed and lengthened or to widen its aperture so that the beam that emerges is widened and shortened.

In another embodiment of the present invention the position of the light source may be varied in response to a signal received when the velocity reaches a certain level thus affecting the size of the beam emitted from the reflector aperture. When the velocity of the vehicle increases the light source is moved away from the aperture, thus narrowing the beam of light. When the velocity of the vehicle decreases the light source is moved toward the aperture, thus widening the beam of light.

BRIEF DESCRIPTION OF THE DRAWINGS

FIG. 1 is a perspective plan view of a vehicle having headlights of the present invention.

FIG. 2 is perspective a plan view of an embodiment of the headlights of the present invention featuring planar reflective vanes.

FIG. 3 is a top plan view of the embodiment of the present invention depicted in FIG. 2.

FIG. 4 is a perspective plan view of another embodiment of the headlights of the present invention featuring a conical shaped reflector.

FIG. 5 is a partial side plan view of the embodiment of the present invention depicted in FIG. 4.

FIGS. 5A and 5B are front plan views of the embodiment of the present invention depicted in FIG. 4.

FIG. 6 is a partial plan view of another embodiment of the headlight of the present invention showing two light source positions.

FIG. 7 is a top plan view of another embodiment of the headlight of the present invention featuring planar reflective vanes and actuators in association with the reflector vanes.

FIG. 8 is the headlight of the present invention depicted in FIG. 6 further including an actuator.

FIG. 9 is another embodiment of the headlight of the present invention featuring an actuator.

DETAILED DESCRIPTION OF THE INVENTION

With reference to FIG. 1 a vehicle 100 is shown having headlights 120 of the present invention having variable beam dimensions. Each headlight 120 may emit a beam 140 having a narrowed beam width and longer length, a beam 160 having a wider beam width and a shorter length, or a beam with a width and length in between. The beam width and length is varied by the various embodiments of the headlight assembly of the present invention presented below.

Referring now to FIG. 2 a light propagating assembly 200 of the present invention is seen between a top cover 250 and a base 260. The assembly features a reflector comprised of opposed planar vanes 210 that are found within the headlight 120 (FIG. 1). The reflectors of the present invention are made of a reflective and resilient material, such as an aluminum alloy. The vanes 210 are for example, rectangular in shape. The vanes 210 are outwardly biased and diverging from each other in an open position. For example, a spring (not shown) is used to bias vanes 210. Between the vanes an opening 212 is seen. A light source 220 such as a light bulb having a filament 222, mounted on a back plate 240 propagates light rays (not shown) that are directed at the reflective vanes 210 and that rebound off the reflectors in a beam and travel through opening 212. Each vane 210 includes a pivot 270 at which the vane is able to move inwardly towards light source 220 and outwardly away from light source 220. Coupled to the vanes 220 is a pair of air ducts 280 made from for example, any resilient material. Air ducts provide for the flow of air 290 through a proximal end of the duct and out a distal end of the duct as indicated by the arrows. The air ducts are for example tubes having a wider proximal end and a narrower distal end as pictured in FIG. 2. Airflow 290 through the duct 280 urges the vanes 210 inwardly when the flow is sufficient to overcome the bias of the vanes.

Referring to FIG. 3 it is seen that the reflector vanes 210, move in an inward or an outward direction. In operation when the vehicle 100 is traveling at a velocity airflow 290 rushes past the vehicle and through the air ducts 280. When the velocity is sufficient to provide an airflow 290 to the ducts 280 that overcomes the outward bias of the vanes 210, the reflector vanes 210 move inward as indicated by the arrows A in between reflector vanes 210. The dotted lines indicate the previous outward position of the vanes 210. As the ducts 280 are connected to the vanes 210 the ducts also move inward. Conversely, after the bias has been overcome, a decreasing airflow 290 results in the movement of the vanes (and duct 290) in an outward position as indicated by the arrows B near pivot 270. The amount of decrease in airflow affects the amount that the vanes 210 move outward whereas the amount of the increase in airflow 290 affects the amount that the vanes 210 move inward.

As the reflective vanes 210 move outwardly or inwardly, the aperture 212 between the vanes increases or decreases in size. A larger aperture changes the dispersion of the light beam and allows for a larger beam width and shorter beam length whereas a smaller aperture changes the dispersion of the light beams and allows for a smaller beam width and a longer length. Therefore, as the vanes 210 move inwardly as velocity thus airflow 290 increases, the size of the beam width decreases. As the vanes move outwardly as velocity therefore airflow 290 decreases, the size of the beam length increases.

In a situation where a driver accelerates to a speed sufficient to overcome the outward bias of vanes 210, the increased airflow urges the reflectors 210 inward and causes a beam aperture 212 size to decrease or narrow, therefore a longer beam with smaller width is emitted. The narrower, longer beam of light 140, as shown in FIG. 1, extends further than the wider, shorter beam of light 160. Therefore, a driver is able to see objects further down the road better when driving faster. When driving at a fast speed it is highly desirable to see objects up in the distance as the present invention allows, so that the driver will know when it is necessary to decelerate.

In a situation where the bias has already been overcome and the driver decelerates thus decreasing the airflow 290, the airflow pressure against the reflectors 290 decreases and the vanes 210 move outwardly a certain distance depending on the amount of deceleration so that a wider, shorter beam of light is emitted. The width and length of the beam is dependent upon the amount the vehicle decelerates and upon the amount of decrease in the airflow to the ducts 280.

In a situation where the vehicle is moving slowly, for example in a situation where the user is in a parking lot, the airflow 290 would not be sufficient to overcome the outward bias of the vanes 210, therefore, the reflector bias is not overcome and the aperture 210 remains wide. A wide beam 160 (FIG. 1) results allowing the driver to see objects nearby that are in front of him and to either side of him.

The strength of the bias of the vanes 210 may vary from no or little bias to a very high bias depending upon the speed at which a driver desires to have the width of a beam narrowed and lengthened or widened and shortened. The increase or decrease in beam width occurs automatically when sufficient changes in speed occur.

Pictured in FIG. 3 in front of aperture 212 is a light diffuser 300 through which reflected beams travel. The reflectors 280 are for example, found within the light diffuser 300 so that the airflow will enter the air ducts 280 as the vehicle travels forward.

Turning now to FIG. 4 there is pictured another embodiment of the present invention. This embodiment assembly 400 features a conically shaped reflector 410 that is coiled. Mounted within the reflector 410 is a light source 420 propagating light rays 422. The reflector includes an arm 430 at one end of the coiled cone 410, the arm moving in a radial direction. The arm 430 extends from a surface of the reflector body 410 and extends along a length of the cone 410. The coil of the conical reflector 410 is tightened or loosened by the arm 430, which is under the influence of an air duct 440 coupled or connected to the conical reflector 410. The air duct is for example an air tube as described above with regard to the embodiment of the invention pictured in FIGS. 2 and 3. As the coil is tightened or loosened, aperture 450 of the cone 410 decreases (narrows) or increases (widens)in diameter.

As shown in FIGS. 5, 5A and 5B the position of the reflector 410 changes as airflow within the duct 440 varies, influencing the arm 430. Arm 430 is biased such that the cone is in an expanded position or open position as shown in FIG. 5A. When air 442 flows within the duct 440 and the airflow 442 is sufficient to overcome the bias, the arm 430 is urged in a direction, for example a counter-clockwise direction tightening the cone 410 and decreasing the size of the aperture 450 as seen in FIG. 5B. Therefore, a narrower, longer beam of light 140 (FIG. 1) results and a driver is able to view objects far in the distance when traveling at a rapid velocity. After the bias has been overcome, a sufficient decrease in velocity, therefore airflow 442, will cause the arm 430 to move in another direction, for example a clockwise direction, thus increasing the size of the aperture 450 of the reflector 410. Therefore, a wider, shorter beam of light 160 (FIG. 1) results and a driver is able to view nearby objects that are in front of him and to either side of him when traveling at a slower velocity that normally would not be visible to him when conventional headlights are used. When a driver is driving at a slow velocity, such as in a parking lot, the airflow 442 is not sufficient to overcome the bias of the arm 430, therefore, the aperture 450 remains large and the beam width remains wide.

FIG. 6 illustrates that the positioning of the light source 680 provides another method for varying the size of the beam. As shown by the dotted lines, when the light source 680 is placed near the aperture 650 the result is a beam 600 that has a wider width than when the light source is placed further away from the aperture 650. The further away the light source is placed from the aperture 650, the narrower the beam width as shown by beam 610. Conversely, the closer the light source is placed to the aperture (see dotted light source 680), the wider the beam width. Here, the reflector 660 stays in a fixed position. The effect of changing the position of the light source 680 on the beam width is not as great as the effect of changing the position of the reflectors 660.

Airflow is directly proportional to vehicular velocity however it may not always be an accurate measure of velocity, as it might not take into account factors such as head and tail winds. Therefore, it is also desirable to include an embodiment of the invention that is directly dependent upon the velocity of the vehicle alone and not upon airflow.

With reference to FIG. 7 an assembly 700 is seen featuring a pair of actuators 710. Light source 740 directs light at reflectors 720, which are for example planar vanes. The light is reflected from the reflectors and is emitted, preferably as a beam through opening 730 and light diffuser 750. The reflectors move under the influence of actuators 710. In this embodiment the actuators 710 are in electronic communication with vehicle 100 having a velocity sensor (not shown). An electronic feedback system is used to actuate the reflectors 720. For example, as the car reaches a predetermined velocity, the velocity sensor emits a signal to the actuators to move the reflectors 720 inwardly or outwardly a certain amount depending on the velocity of the car. Feedback systems known in the art may optionally be used. For example, once the reflectors 720 have moved the desired amount an electronic signal is sent back to velocity sensor indicating that the reflectors have moved appropriately. As the reflectors 720 move inwardly or outwardly (indicated by the dotted lines) the size of the aperture 730 increases or decreases, thus increasing or decreasing the beam dimensions as described above.

With reference to FIG. 8 there is seen an actuator 800 attached to light source 680. The actuator moves the light source 680 toward or away from the aperture 650, thereby providing a beam with an increased width 600 or a decreased width 610. As described above with regard to FIG. 7, the actuator is for example, in electronic communication with the velocity sensor of the vehicle. An electronic feedback mechanism as described above can be used to provide a signal to the actuator that the light source 680 should be moved.

With reference to FIG. 9 an assembly 900 featuring an actuator 910 is used to move radial arm 920 in a direction that increases or decreases the size of the reflector cone 930 and its aperture 940. Light source 950 is located within cone 930 and emits light rays that are reflected from reflector cone 930 and emerge preferably as a beam through aperture 940. The actuator 910 is responsible for moving the arm 920 a certain amount, thus tightening or loosening the cone. For example, movement in one direction may tighten the cone, thus decreasing the aperture size and narrowing the beam width and a movement in another direction may loosen the cone thus increasing the aperture size and widening the beam width. For example, a counter-clockwise movement may tighten the cone and clockwise movement may loosen the cone. The actuator 910 is for example in electrical communication with a velocity sensor of a car as described above.

In the present invention, beam width is directly proportional to the size of the reflector aperture and beam length is inversely proportional. The sizes of the reflector aperture and beam width are inversely proportional to the velocity of the vehicle or to the airflow intensity of an operational vehicle. Conversely, the beam length is directly proportional to velocity. As the beam width increases, the length decreases and as the length increases, the width decreases.

Both the conical shaped reflector and the planar vane reflectors may roughly simulate a parabola and portions of a parabola respectively, thus roughly simulate the characteristics of a parabola. For instance, a parabola is formed by the surface of a circular cone when the cone is sliced by a plane parallel to a side of the cone. Also, the reflector vanes simulate the sides of a parabola not exhibiting curvature. All rays of light emanating from a parabola's focus will after reflection emerge parallel to each other. This characteristic is desirable in projecting a powerful beam of light and is roughly simulated with the use of the conical reflector and planar vane reflectors.

Various embodiments of the invention may be used in conjunction with other embodiments of the invention described above.

What is claimed is:

1. A variable beam headlight for a vehicle comprising,
a beam forming reflector biased in an open position and having an aperture through which a beam having a beam dimension passes, said beam dimension dependent on said aperture size;
a light source directing light toward said reflector thereby forming said beam; and
an air duct coupled to said reflector receiving an airflow within said duct directed at said reflector, wherein increasing airflow in said duct by an amount sufficient to overcome said bias narrows said reflector aperture and wherein decreasing airflow in said duct directed at said reflector that has overcome said bias, widens said reflector aperture.

2. The headlight of claim 1 wherein said beam dimension is width and said width of said beam increases with said aperture of said reflector.

3. The headlight of claim 2 wherein light beam width is inversely proportional to airflow in said air duct.

4. The headlight of claim 1 wherein said beam dimension is length and said length of said beam increases as said aperture of said reflector decreases in size and said airflow increases.

5. The headlight of claim 1 wherein said reflector is a pair of opposed vanes outwardly biased in a diverging position.

6. The headlights of claim 5 wherein said air duct is a pair of opposed air tubes coupled to said vanes.

7. The headlight of claim 5 wherein said vanes are planar.

8. The headlight of claim 5 wherein airflow is stronger than said bias, converging said vanes.

9. The headlight of claim 5 wherein said pair of vanes is spring-biased.

10. The headlight of claim 5 wherein said pair of vanes includes a pivot at one end of each of said vanes.

11. The headlight of claim 1 wherein said headlight is a part of a vehicle having a velocity and airflow is directly proportional to said vehicular velocity.

12. The headlight of claim 1 further comprising a light diffuser located at a front end of said headlight wherein said beam travels through said light diffuser.

13. The headlight of claim 1 further comprising a casing including an upper frame and a lower frame within which said reflector and light source are located.

14. The headlight of claim 1 wherein said air duct includes a proximal end and a distal end connected to said reflector, said airflow entering said duct through said proximal end and exiting said duct through said distal end, influencing said detector.

15. The headlight of claim 1 wherein said reflector is conical in shape.

16. The headlight of claim 15 wherein said conical reflector includes a biased radial arm.

17. The headlight of claim 16 wherein said air duct is coupled to said radial arm.

18. The headlight of claim 16 wherein said dimension is a beam width and a beam length and said beam width is directly proportional to aperture size and said beam length is inversely proportional to said aperture size.

19. The headlight of claim 18 wherein said airflow is directly proportional to a velocity of a vehicle.

20. A variable beam headlight in a vehicle having a velocity comprising, a light beam forming reflector within said vehicle, said reflector having an aperture through which a light beam having a length and a width passes, said beam width inversely proportional to a vehicular velocity, and said length directly proportional to said vehicular velocity;

a light source directing light towards said beam forming reflector; and a velocity sensor within said vehicle, said sensor in electrical communication with said headlight and providing a signal to said headlight at a predetermined velocity to vary said beam length and width.

21. The headlight of claim 20 further comprising an actuator in electrical communication with said velocity sensor and said reflector wherein said sensor is in electrical communication with said reflector and said actuator receives said signal from said sensor at said predetermined speed to position said reflector, varying the length and width of said beam.

22. The headlight of claim 20 further comprising an actuator in electrical communication with said sensor and said light source, wherein said sensor is in electrical communication with said light source and said actuator receives said signal from said sensor at said predetermined speed to position said light source, varying the length and width of said beam.

23. The headlight of claim 22 wherein said light source is positioned near the aperture, widening said beam.

24. The headlight of claim 19 wherein said light source is positioned away from the aperture, lengthening said beam.

* * * * *